(12) United States Patent
Melville et al.

(10) Patent No.: US 12,134,100 B2
(45) Date of Patent: Nov. 5, 2024

(54) LINER ASSEMBLY FOR ORE GRINDING MILL

(71) Applicant: COMPAÑÍA ELECTRO METALÚRGICA S.A., Santiago (CL)

(72) Inventors: Jason S. Melville, Phoenix, AZ (US); Ariel Medina, Region Metropolitana (CL)

(73) Assignee: COMPAÑÍA ELECTRO METALÚRGICA S.A., Santiago (CL)

(*) Notice: Subject to any disclaimer, the term of this patent is extended or adjusted under 35 U.S.C. 154(b) by 0 days.

(21) Appl. No.: 18/304,797

(22) Filed: Apr. 21, 2023

(65) Prior Publication Data
US 2023/0294104 A1    Sep. 21, 2023

Related U.S. Application Data

(62) Division of application No. 16/443,388, filed on Jun. 17, 2019, now Pat. No. 11,666,922.
(Continued)

(51) Int. Cl.
*B02C 17/18*    (2006.01)
*B02C 17/02*    (2006.01)
(Continued)

(52) U.S. Cl.
CPC .......... *B02C 17/1805* (2013.01); *B02C 17/02* (2013.01); *B02C 17/22* (2013.01);
(Continued)

(58) Field of Classification Search
CPC ..... B02C 17/1805; B02C 17/02; B02C 17/22; B02C 25/00; B02C 2201/00; B02C 2201/01
See application file for complete search history.

(56) References Cited

U.S. PATENT DOCUMENTS 5,360,174 A * 11/1994 Persson ................. B02C 17/205
73/862.634
6,874,364 B1    4/2005 Campbell et al.
(Continued)

FOREIGN PATENT DOCUMENTS

AU    2014200336 A1    8/2014
AU    2016201211 A1    3/2016
(Continued)

OTHER PUBLICATIONS

English translate (CN105636786B), retrieved date Oct. 23, 2023.*
(Continued)

*Primary Examiner* — Mohammed S. Alawadi
(74) *Attorney, Agent, or Firm* — MERCHANT & GOULD P.C.

(57) ABSTRACT

The present invention provides a system and method for more efficient utilization of comminution mills. Sensors are provided in the liners placed within the mill shell. The sensors may include RFID tags, liner wear profile sensors (e.g., such as an ultrasonic sensor), an inertial sensor (preferably included both an inclinometer and an accelerometer, and an acoustic sensor, among others. When the liners are installed in the shell, the RFID tag is used to register the location of the liner within the shell. In operation, the information provided by the sensors is collected by a data transmission unit and sent by transmitter over the air to a computer having an antenna and receiver for such data. The data is correlated and the data is reviewable in real time while the mill is in running.

3 Claims, 7 Drawing Sheets

Related U.S. Application Data

(60) Provisional application No. 62/686,649, filed on Jun. 18, 2018.

(51) Int. Cl.

| | | |
|---|---|---|
| *B02C 17/22* | (2006.01) | |
| *B02C 25/00* | (2006.01) | |
| *G01B 7/06* | (2006.01) | |
| *G01B 17/02* | (2006.01) | |
| *G01N 29/07* | (2006.01) | |
| *G05B 1/00* | (2006.01) | |
| *G05B 23/02* | (2006.01) | |

(52) U.S. Cl.
CPC ............... *B02C 25/00* (2013.01); *G01B 7/06* (2013.01); *G01B 17/02* (2013.01); *G01N 29/07* (2013.01); *G05B 1/00* (2013.01); *G05B 23/0283* (2013.01); *B02C 2201/00* (2013.01); *B02C 2210/01* (2013.01)

(56) References Cited

U.S. PATENT DOCUMENTS

| | | | |
|---|---|---|---|
| 6,874,366 | B2 | 4/2005 | Magne Ortega et al. |
| 7,172,144 | B1 | 2/2007 | Slater et al. |
| 7,677,079 | B2 | 3/2010 | Radziszewski et al. |
| 7,957,944 | B2 | 6/2011 | Herbst |
| 11,583,865 | B2 | 2/2023 | Saxena et al. |
| 11,666,922 | B2 | 6/2023 | Melville et al. |
| 2004/0255679 | A1 | 12/2004 | Valderrama Reyes et al. |
| 2012/0217357 | A1 | 8/2012 | Franke |
| 2014/0150524 | A1 | 6/2014 | Magne et al. |
| 2015/0362306 | A1* | 12/2015 | Steed ............ G01B 7/02 324/700 |
| 2017/0003208 | A1 | 1/2017 | Steed et al. |
| 2017/0050769 | A1 | 2/2017 | Steed et al. |
| 2020/0122156 | A1 | 4/2020 | Saxena et al. |

FOREIGN PATENT DOCUMENTS

| | | | | |
|---|---|---|---|---|
| AU | 2016201314 | A1 | 3/2016 | |
| CN | 101408103 | A | 4/2009 | |
| CN | 104162472 | A | 11/2014 | |
| CN | 105592927 | A | 5/2016 | |
| CN | 105651213 | A | 6/2016 | |
| CN | 106853405 | A | 6/2017 | |
| CN | 105636786 | B * | 5/2018 | ............ B01D 45/12 |
| SU | 1192855 | A1 | 11/1985 | |
| WO | 93/00997 | A1 | 1/1993 | |
| WO | 2008/021040 | A1 | 2/2008 | |
| WO | 2019/086577 | A1 | 5/2019 | |

OTHER PUBLICATIONS

Acoustic Wave Technology Sensors_ Fierce Electronics, retrieved date Mar. 6, 2022. https://www.fierceelectronics.com/sensors/exodigo-uses-sensors-ai-make-underground-maps.

International Preliminary Report on Patentability for Application No. PCT/US2019/037470, completed Jun. 18, 2020, 17 pages (includes Amendment under Article 34).

International Search Report and Written Opinion for Application No. PCT/US2019/037470 mailed Sep. 20, 2019.

International Search Report and Written Opinion for Application No. PCT/US2019/067238 mailed Apr. 23, 2020.

Process monitor of grinding machine, retrieved date Mar. 6, 2022. file:///C:/Users/malawadi/Desktop/Application/A%2016443388/Process%20Monitor%20of%20gridning%20machine.pdf.

Sensors Automate Grinding, retrieved date Oct. 17, 2021; https://www.mmsonline.com/articles/sensors-automate-grinding-dressing-wheel-positioning- (2 pages).

* cited by examiner

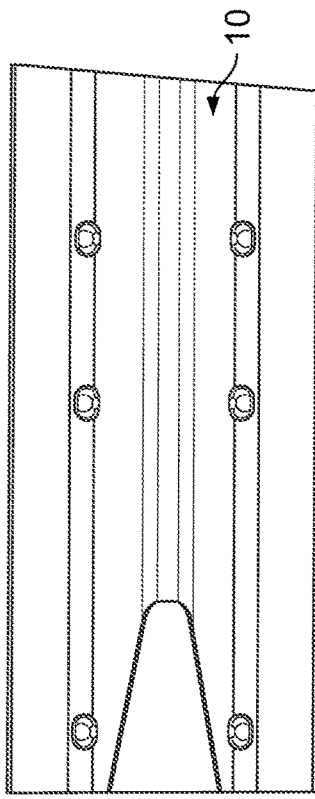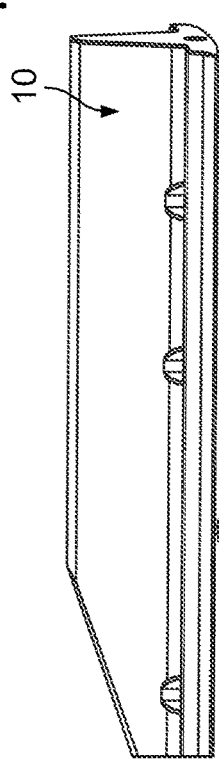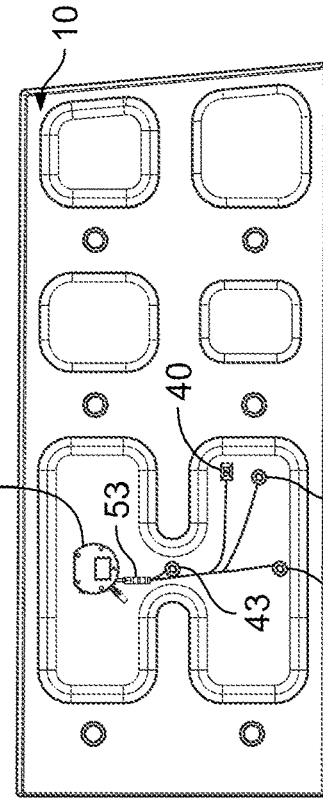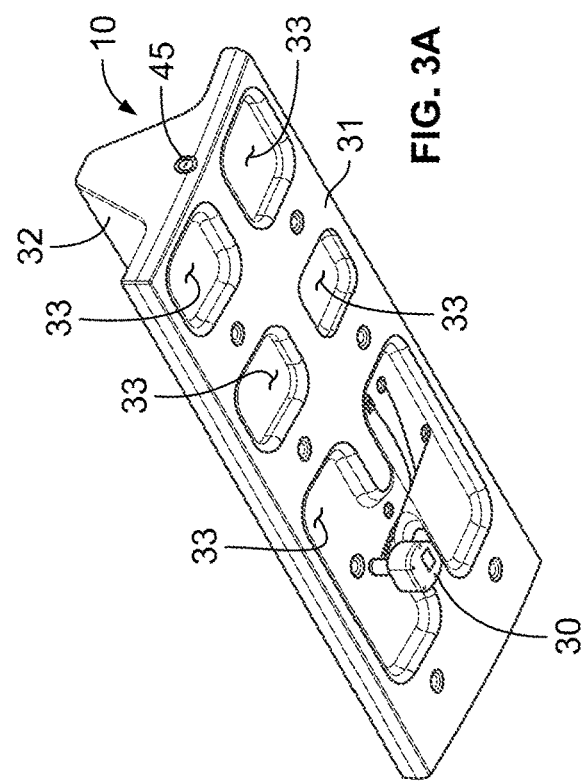

LINER ASSEMBLY FOR ORE GRINDING MILL

CROSS-REFERENCE TO RELATED APPLICATION

This application is a divisional of U.S. patent application Ser. No. 16/443,388, claims the benefit of U.S. Provisional Patent Application Ser. No. 62/686,649, filed on Jun. 18, 2018, the disclosure of which is incorporated herein by reference in its entirety.

FIELD OF THE INVENTION

The present invention relates generally to mining, more particularly to ore grinding and milling machines, and still more particularly to a system and method for more efficient utilization of comminution mills.

BACKGROUND OF THE INVENTION

Comminution mills are large rotating drums for reducing ore to a usable form. Ore, or "media," tumbles within the drum as it rotates, falling upon itself, impacting the inner surfaces of the mill, and impacting mill charge, which often includes loose metal balls or rods inside the mill. This process cuts, crushes, and grinds large ore into small ore, or small ore into fine powder.

The milling process is quite old but works well. Interactions between the media, the charge, and the inner surfaces can quickly reduce ore to a manageable and usable form, depending on the application. Not surprisingly, this process is incredibly destructive on the machinery. As a result, mills are always fit with liners. Were mills not protected with liners, the media and charge would directly impact the shell of the mill, would wear a hole through the shell, and the entire mill would be have to be replaced. The use of liners protects the shell. Accordingly, instead of the mill wearing out, the liners are worn as the mill operates.

Eventually the liners must be replaced. However, downtime of a day or two during re-line can represent potentially tens if not hundreds of thousands of dollars in lost opportunity. Mill operators thus prefer to perform re-lines as infrequently and as quickly as possible. But they must perform repair work every time a liner becomes damaged to the point where it jeopardizes the safety or integrity of the mill. So mill operators sometimes replace liners or perform re-lines too soon. When an entire crew is performing a re-line, it can be more efficient to replace partially worn liners that still have usable life in them than to bring the crew back later and put the mill out of commission a second time. Premature or unnecessary replacement has costs, too, of course.

Therefore, there arises a need in the art for a system and method to monitor liners, schedule re-lines, and improve efficiency of comminution mills.

SUMMARY

The present invention discloses a system and method for more efficient utilization of comminution mills. One or more sensors are provided in the liners placed within the mill shell. The sensors may include RFID tags, liner wear profile sensors (e.g., such as an ultrasonic sensor), an inertial sensor (preferably included both an inclinometer and an accelerometer, and an acoustic sensor, among others. When the liners are installed in the shell the RFID tag is used to register the location of the liner within the shell.

In operation, the information provided by the sensors is collected by a data transmission unit and sent by transmitter over the air to a computer having an antenna and receiver for such data. The computer's CPU takes the data and updates a database using the RFID information to correlate the received information to the respective liner. An operator is able to review the data in real time while the mill is in running to determine the efficiency of the mill and to determine if the any of the liners require replacement. Changes may be made to the operation of the mill based on this information.

Therefore, according to one aspect of the invention, there is provided a liner assembly, of the type utilized as a wear item in the interior of a comminution mill from the media and charge, comprising: a body having a length, width, and depth, the body located within the comminution mill and further having a void formed in a portion of the body; and a sensor located in the void in the body, the sensor arranged and configured to measure a change in the depth of the body.

Further to the above paragraph, additional aspects include (alone or in combination): wherein the sensor is an ultrasonic sensor; further including an acoustic sensor for generating a signal indicative of the number of strikes on the liner assembly from the media and charge during operation of the comminution mill; further including an accelerometer sensor for generating a signal indicative of the intensity of strikes on the liner assembly from the media and charge during operation of the comminution mill; further including an accelerometer sensor for generating a signal indicative of the relative position of the liner assembly within the comminution mill during operation of the comminution mill; and wherein the liner assembly further includes an RFID tag, whereby the location of the liner assembly within the comminution mill may be registered upon installation of the liner assembly within the mill.

According to second aspect of the invention, there is provided a system for monitoring the operation of a comminution mill, comprising: a plurality of liner assemblies, the liner assemblies located within the comminution mill in a known position; a plurality of sensors to monitor a wear parameter of the liner assemblies, wherein each liner assembly includes a corresponding sensor, each sensor is arranged and configured to generate a first signal indicative of a wear parameter of the corresponding liner assembly, and each sensor is located at least partially within the corresponding liner assembly; and a plurality of transmitters, the plurality of transmitters transmitting the first signals for comparison to predetermined wear reference values.

According to yet another aspect of the invention, there is provided a method for determining the timing for replacement of a liner assembly within a comminution mill, comprising: placing a sensor for measuring a wear profile within a liner assembly; registering the position of the liner assembly within the comminution mill, whereby position of the sensor within the comminution mill is also known; and monitoring the output of the sensor to determine an appropriate time to replace the liner assembly based on the wear profile.

While the invention will be described with respect to preferred embodiment configurations, methods and specifications, it will be understood that the invention is not to be construed as limited in any manner by either such configuration, methods and/or specifications described herein. Further, while the various sensors are described as specific types of sensors herein and are shown in specific locations within the liners, the principles of this invention extend to utilizing sensors located within the drum (i.e., within the shell of the comminution mill). These and other variations of the inventions will become apparent to those skilled in the art upon a more detailed description.

The advantages and features which characterize the inventions are pointed out with particularity in the claims annexed hereto and forming a part hereof. For a better understanding of the inventions, however, reference should be had to the drawings which form a part hereof and to the accompanying descriptive matter, in which there is illustrated and described embodiments of the inventions.

BRIEF DESCRIPTION OF THE DRAWINGS

Referring to the drawings wherein like numerals represent like parts throughout the several views:

FIGS. 3A-3D are bottom perspective, top plan, side elevation, and bottom plan views of a liner assembly, respectively;

DETAILED DESCRIPTION

Figure 1:
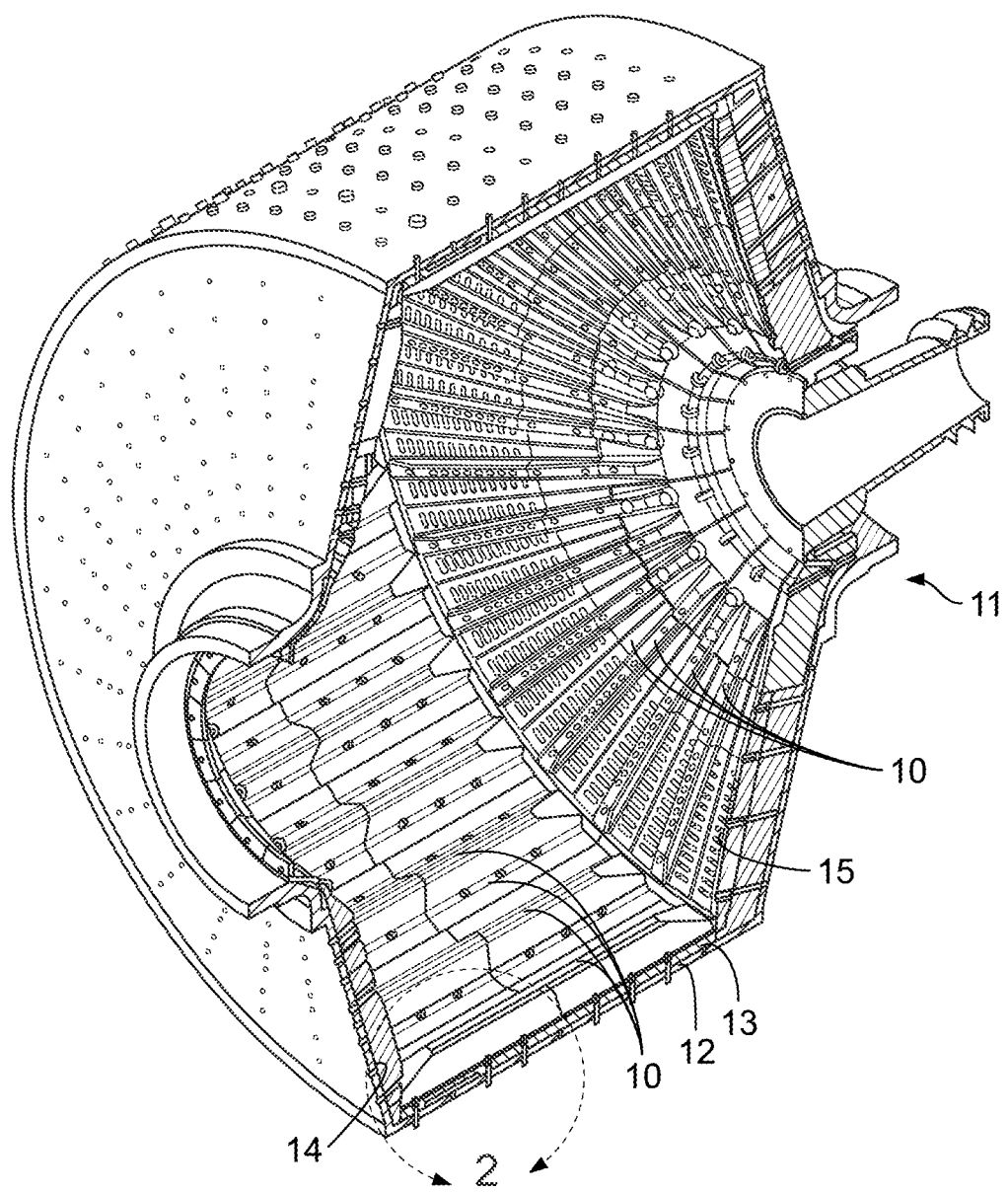
FIG. 1 is a partial section view of a mill outfitted with improved liner assemblies.

Reference now is made to the drawings, in which the same reference characters are used throughout the different figures to designate the same elements. FIG. 1 is a partial section view of an ore grinding mill 11 fitted with a plurality of liner assemblies 10. The liner assemblies 10 protect a shell 12 of the mill 11 during operation of the mill 11, when it is comminuting ore. The liner assemblies 10 are arranged along the inner surface of a cylindrical sidewall 13 of the shell 12 and also on the inner surface of opposed endwalls 14 and 15. The liner assemblies 10 mounted on the sidewall 13 are different in shape and arrangement from the liner assemblies 10 on the endwalls 14 and 15 but have the inventive features and elements described herein. As such, the description herein refers only to the liner assemblies 10 on the cylindrical sidewall 13 with the understanding that it applies equally to the liner assemblies on the endwalls 14 and 15.

Figure 2:
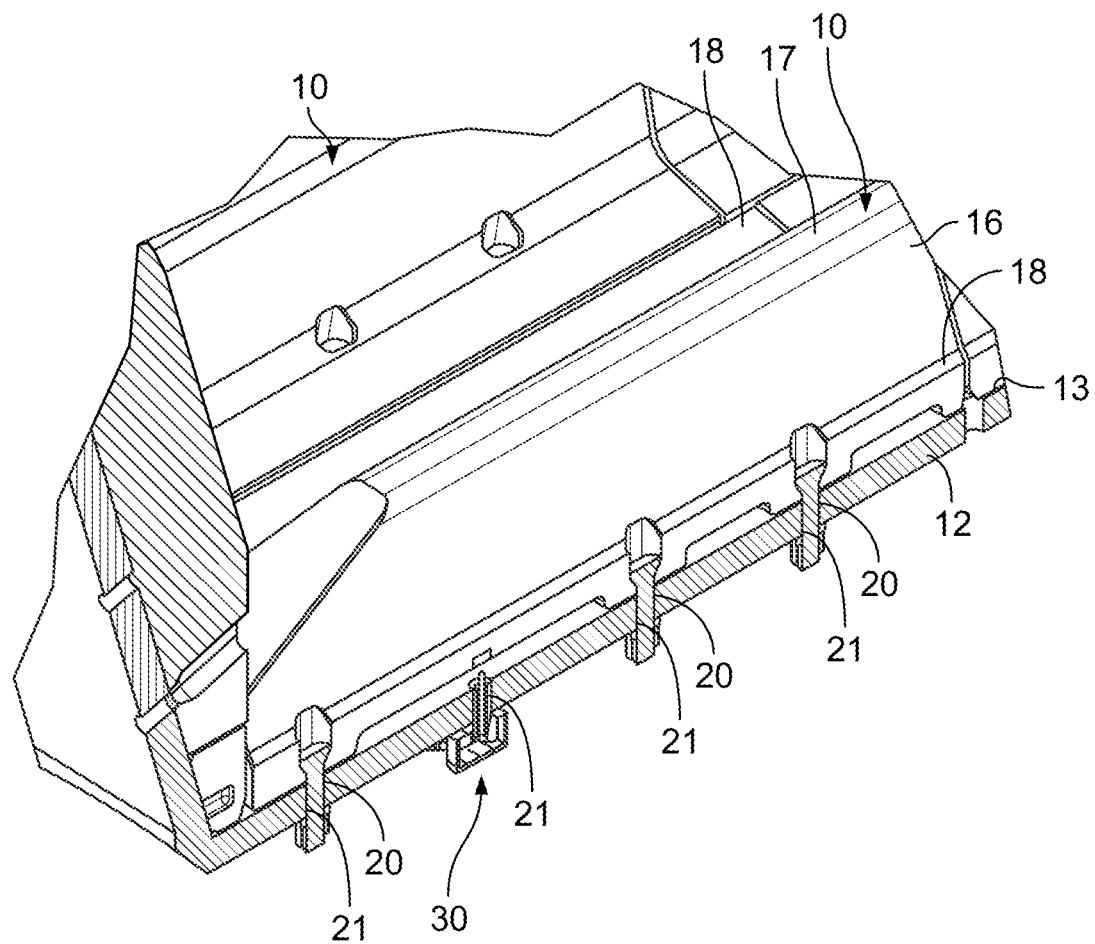
FIG. 2 is an enlarged partial section view showing two liner assemblies installed on the shell of the mill.

FIG. 2 shows in greater detail two liner assemblies 10 mounted to the shell 12. Only one liner assembly 10 will be referred to herein. The liner assembly 10 has a body 16 including a central crown 17 and opposed side flanges 18. The body 16 is elongate, and the crown 17 and flanges 18 extend along the length of the body 16. The crown 17 projects upwardly from the flanges 18 and is a prominent impact site for the ore as it tumbles within the mill 11. The crown 17 has two angled impact surfaces which extend obliquely down to the flanges 18.

The liner assembly 10 is mounted to the shell 12 with a plurality of bolts 20. The bolts 20 are passed through bores 21 in the shell 12 and secured with nuts 22 on the outside of the shell 12, where each nut 22 can be accessed and tightened and loosened on a particular bolt 20. The bolts 20 have enlarged heads which are seated in bores 23 in one of the flanges 18 of the liner assembly 10 to hold the liner assembly 10 tightly and securely to the shell 12. The bores 21 are pre-formed through the shell 12 by the manufacturer of the mill 11, and the bores 23 in the liner assembly 10 are formed to register with those bores 21. However, not all of the bores 21 in the shell 12 correspond to the bores 23 in the liner assembly 10. Instead, at least one bore 21 under each liner assembly 10 is occupied by a data transmission unit ("DTU") 30. The DTU 30 is connected to various data-gathering instruments on the liner assembly 10.

FIG. 3A illustrates the liner assembly 10 from "below," showing the inner surface 31 which is concealed against the shell 12 when mounted thereon, and which is opposite the outer wear surface 32 exposed to the milling charge and ore. Several depressions are formed inward into the liner assembly 10 from the inner surface 31, defining cavities 33 in the liner assembly 10. The data-gathering instruments are preferably mounted in these cavities 33.

As seen in FIG. 3D, within an H-shaped cavity 33 are disposed an inertial sensor 40, an acoustic sensor 41, and two ultrasonic sensors 42 and 43. Each of these sensors 40-43 is coupled in wired data communication with the DTU 30. The sensors 40-43 gather information about the operation of the mill 11, the conditions of the charge and media, and the conditions of the liner assembly 10 itself.

The inertial sensor 40 includes both an accelerometer and an inclinometer. When connected through the DTU 30 to a computer (described in more detail below), the inertial sensor 40 provides information about the movement of the mill 11. The inertial sensor 40 records data about rotational acceleration and velocity of the mill 11. The inclinometer provides information about the angle of the liner assembly 10, from which a computer can determine the position of the liner assembly 10 in the mill 11. In other words, based on the incline of the inertial sensor 40, the computer can determine, for example, if the liner assembly has rotated around to the bottom of the mill 11, is at the top of the mill 11, or is somewhere therebetween. The computer can thus determine the orientation of the crown 17 and the wear surfaces of the crown 17.

The acoustic sensor 41 records information about impacts on the wear surface 32 of the liner assembly 10. The acoustic sensor 41 can measure the number, frequency, and intensity of impacts of charge and media against the liner assembly 10. The intensity of the impacts corresponds to the proportion of charge and media impacting the liner assembly 10, and so the operator can determine how much ore is hitting the liner assembly 10 versus milling charge. Impacts of different proportions of media and charge have different comminution efficiencies, and so knowing the type of impact occurring within the mill 11 is useful in analyzing whether the impacts are effectively reducing the ore. Moreover, the intensity of the impact also corresponds to the context of the impact, namely, whether the mix of media and charge is falling upon itself or is falling upon exposed wear surfaces of the liner assemblies 10. This, too, affects both the efficiency of the comminution and the wear on the liner assemblies 10. By combining this data with that gathered from the inertial sensor 40, a mill operator can determine how the rotational speed of the mill 11 affects the efficiency of the communication and the wear on the liner assemblies 10. The operator can then adjust the speed of the mill 11 to make milling more or less efficient, faster or slower, hotter or cooler, etc.

Figure 4:
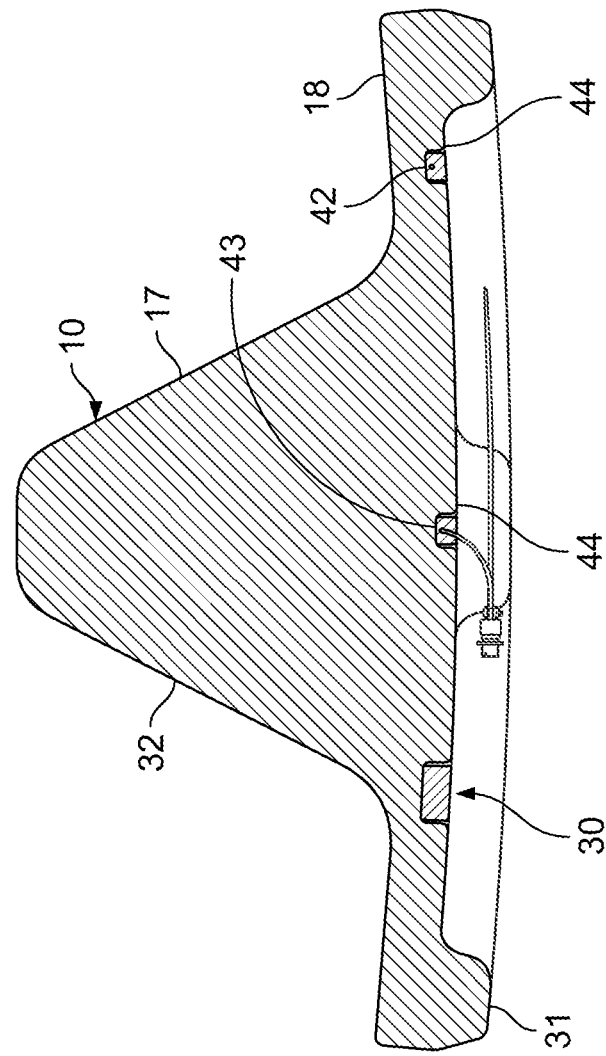
FIG. 4 is a section view through a liner assembly.

The ultrasonic sensors 42 and 43 are shown in FIG. 3D but also in FIG. 4. The sensors 42 and 43 are mounted within small sockets or seats 44 set in from the cavity 33. One ultrasonic sensor 43 is mounted under the crown 17 and the other is mounted under the flange 18. The ultrasonic sensors 42 and 43 transmit ultrasonic waves within the body of the liner assembly 10. The waves bounce within the body and some return to the sensors 42 and 43 where they are received. The sensors 42 and 43 collect this data and transmit it to the DTU 30. A computer connected to the DTU 30 can interpret the data to determine whether and how far the wear surface 32 of the liner assembly 10 is worn or damaged. When a threshold level of wear is detected, the mill operator instructs the liner assembly 10 to be replaced.

When replacement is necessary, the mill operator can easily identify the liner assembly 10. As seen in FIG. 3A, the liner assembly 10 includes an RFID tag 45. The RFID tag 45 is attached to the end of the liner assembly 10 and is coupled in wireless data transmission to the DTU 30. The RFID tag 45 is programmed with identification information when the body 16 of the liner assembly 10 is molded and is affixed to the body 16 just after the body 16 is heat treated. The RFID tag 45 thus is used for identification of the liner assembly 10 not just during the operating life of the liner assembly 10, but before and after as well. The foundry which creates the body 16 of the liner assembly 10 tracks its movement through the foundry grounds with the RFID tag 45, tracks application of the DTU 30 and the sensors 40-43 to the body 16, and tracks the liner assembly 10 through shipping and delivery. When the liner assembly 10 is applied to the mill 11 during initial construction or a re-line, the date and time of installation are recorded and associated with the RFID tag 45, so that the precise operating life of the liner assembly 10 is known. In this way, automatic and electronic records can be maintained for each liner assembly 10 throughout its lifecycle. When the liner assembly 10 needs to be removed, it can be quickly located with the RFID tag 45.

Figure 5:
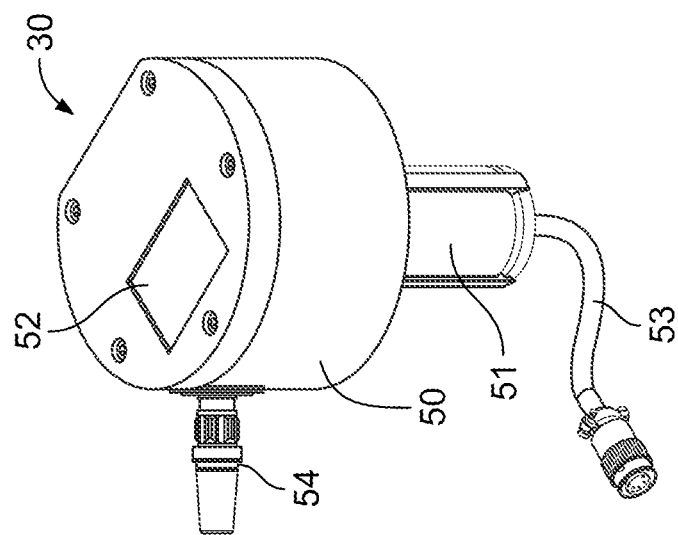
FIG. 5 is a top perspective view of a data transmission unit for use in the liner assembly.

The DTU 30 on each liner assembly 10 provides the communication between the sensors 40-43, the RFID tag 45, and the mill operator's computer. FIG. 5 shows the DTU 30 in detail. The DTU 30 includes a rugged housing 50 with a narrowed post 51. The housing 50 contains a stored power source such as a battery and a programmable controller coupled to an LCD display 52 carried on a head end of the DTU 30 for displaying information relating to the DTU 30 and to the sensors 40-43.

Figure 6:
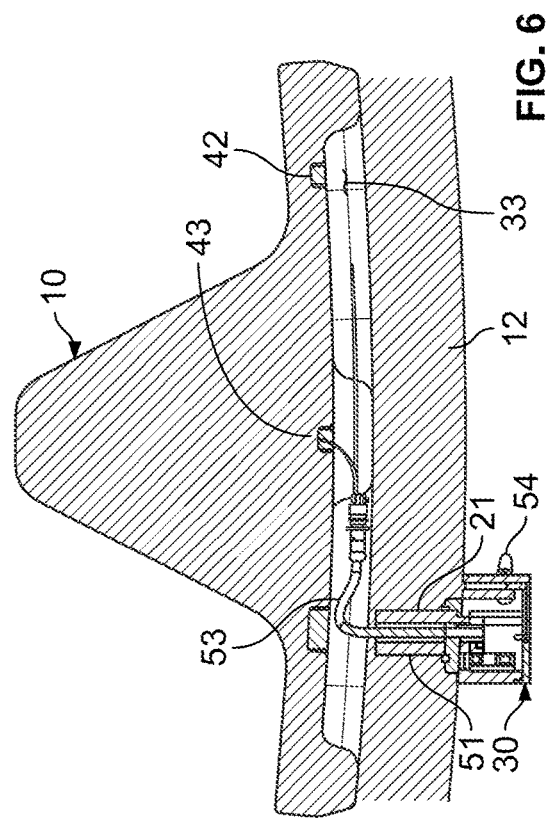
FIG. 6 is a section view through a liner assembly installed in the shell of the mill.

The controller within the housing 50 is coupled to the sensors 40-43 with a connector cable 53 extending from the end of the post 51. As seen in FIG. 6, the cable 53 runs through the cavity 33 from the post 51 to the sensors 40-43. The second view of FIG. 6 shows the cable 53 connecting only the ultrasonic sensor 43, but FIG. 3D shows the cable 53 connected to all the sensors 40-43. Thus, there is a physical, wired connection between the DTU 30 and the sensors 40-43, whereas there is a wireless connection between the DTU 30 and the RFID tag 45.

Figure 7:
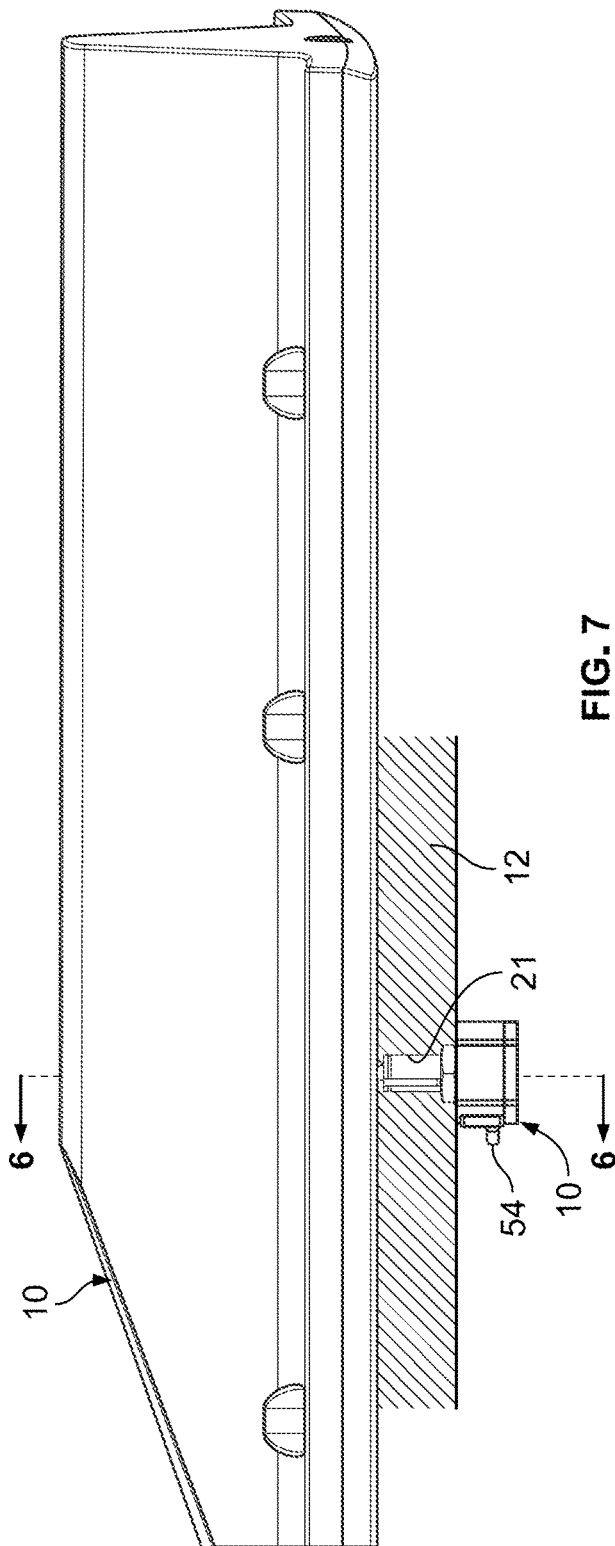
FIG. 7 is a side elevation view of a liner assembly installed in the shell of the mill.

FIGS. 6 and 7 also show how the DTU 30 is mounted in the shell 12. Rather than being buried in the liner assembly 10, the DTU 30 is set into a bore 21. The post 51 is snug fit into the bore 21 and is secured with fasteners or bolts into the shell 12. To prevent the possibility of slurry leakage through the bore 21, a gasket is compressed between the bore 21 and the DTU 30. The length of the post 51 is approximately equal to the thickness of the shell 12, and the post 51 extends through the shell 12 in the bore 21 to the cavity 33. This arranges the head end of the DTU 30 outside the shell 12, so that the display 52 can be observed. The head end further has an antenna 54. The antenna 54 couples the DTU 30 to a wireless data network, so that the mill operator's computer can connect with the DTU 30, the sensors 40-43, and the RFID tag 45.

Figure 8:
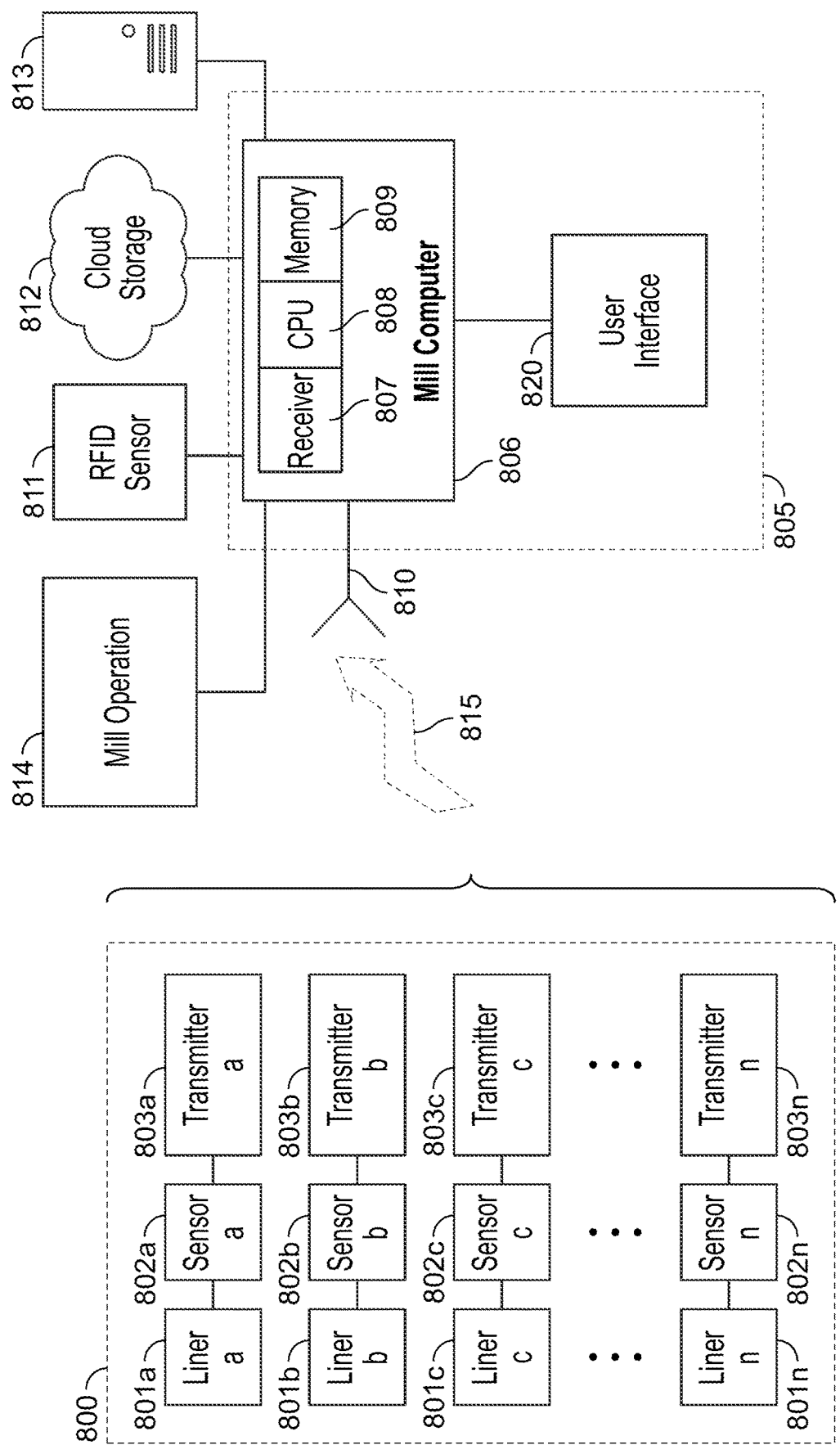
FIG. 8 is a schematic functional block diagram of the system utilized in connection with the various sensors installed in the liner assembly.

Turning now to FIG. 8 a functional block diagram is illustrated of an embodiment in accordance with the principles of the present invention. The shell of the mill is illustrated in dashed line at 800. Included in shell 800 is the mill cylindrical shell 12 and the mill conical heads at the feed end and the discharge end. The plurality of liner assemblies 801a, 801b, 801c . . . 801n may each be arranged and configured in accordance with the description of liner assembly 12 above. Further, each respective liner assembly 801a-801n preferably includes at least one corresponding sensor 802a, 802b, 802c . . . 802n and a corresponding transmitter 803a, 803b, 803c. 803n.

In one embodiment, each of the liner assemblies 801a-801n includes a plurality of sensors, including an RFID sensor, an inclinometer, an acoustic sensor, an inertial sensor and an ultrasonic sensor. However, it will be appreciated that the number of sensors in each liner assembly 801a-801n may vary. For example, in connection with the liner assemblies located on the mill conical heads, providing all of the sensors in each liner assembly may not be useful and/or required. Thus, the blocks 802a-802n generally include from at least at least one sensor up to several sensors.

Representative examples of sensors which may be used in connection include the following. The accelerometer (inertial sensor) is a 3-axis commercial device available under model number ADXL337 manufactured by Analog Devices of Norwood, Massachusetts. The acoustic sensor is a sound impact sensor available under model number Parallax 29132 of Parallax, Inc. of Rocklin, California. One data transmitter which may be used as part of the DTU is available commercially under the model number designation Photon in Particle's Internet of Things, San Francisco, California. Ultrasonic sensors for use as non-destructive testing thickness gauges are available commercially from many different manufacturers (e.g., Cygnus Instruments of Jacksonville, Florida).

A mill computer 806 is illustrated as including a receiver 807, processor or CPU 808, and memory 809. The computer may be a personal computer or a special purpose computer. A monitor and attendant user interface devices, such as input devices (i.e., a mouse and keyboard) are shown at block 820. The mill computer 806 and user interface 820 together comprise the mill performance evaluation block identified by 805. For example, the data received from the sensors 802a-802n may be compiled into a spreadsheet in real time so that a user may review the data at the mill performance block 805 and make adjustments to the operation of the mill and/or to determine that one or more liner assemblies 801a-801n have become thin or otherwise worn, and need to be replaced. A wear profile for the liner assemblies 801a-801n is preferably determined such that the user is able to identify from the data when a wear level is reached and replacement is desired for any individual liner 801a-801n. Further, the computer 806 is preferably connected to the mill operation block 814 so that a user may adjust the operating parameters of the mill (i.e., such as mill speed and ore feed rate, among others) based on the data received from the various sensors 802a-802n.

Antenna 810 receives the data from the plurality of transmitters 803a-803n. The antenna is connected to receiver 807. The plurality of over-the-air signals is identified by the arrow 815. To store the data, the computer 806 includes memory 809, as well as preferably being connected to cloud storage 812 and/or server 813.

Computer 806 is further connected to RFID sensor 811. The RFID sensor 811 may be used to determine the location of the specific liner assembly 801 by scanning an RFID tag on the liner assembly during the installation of the liner assembly within the mill 800. In this manner the location of the liner assembly and its corresponding sensors are in a known (or registered) location both within the mill 800 and in a position relative to the other liner assemblies 801a-801n.

Figure 9:
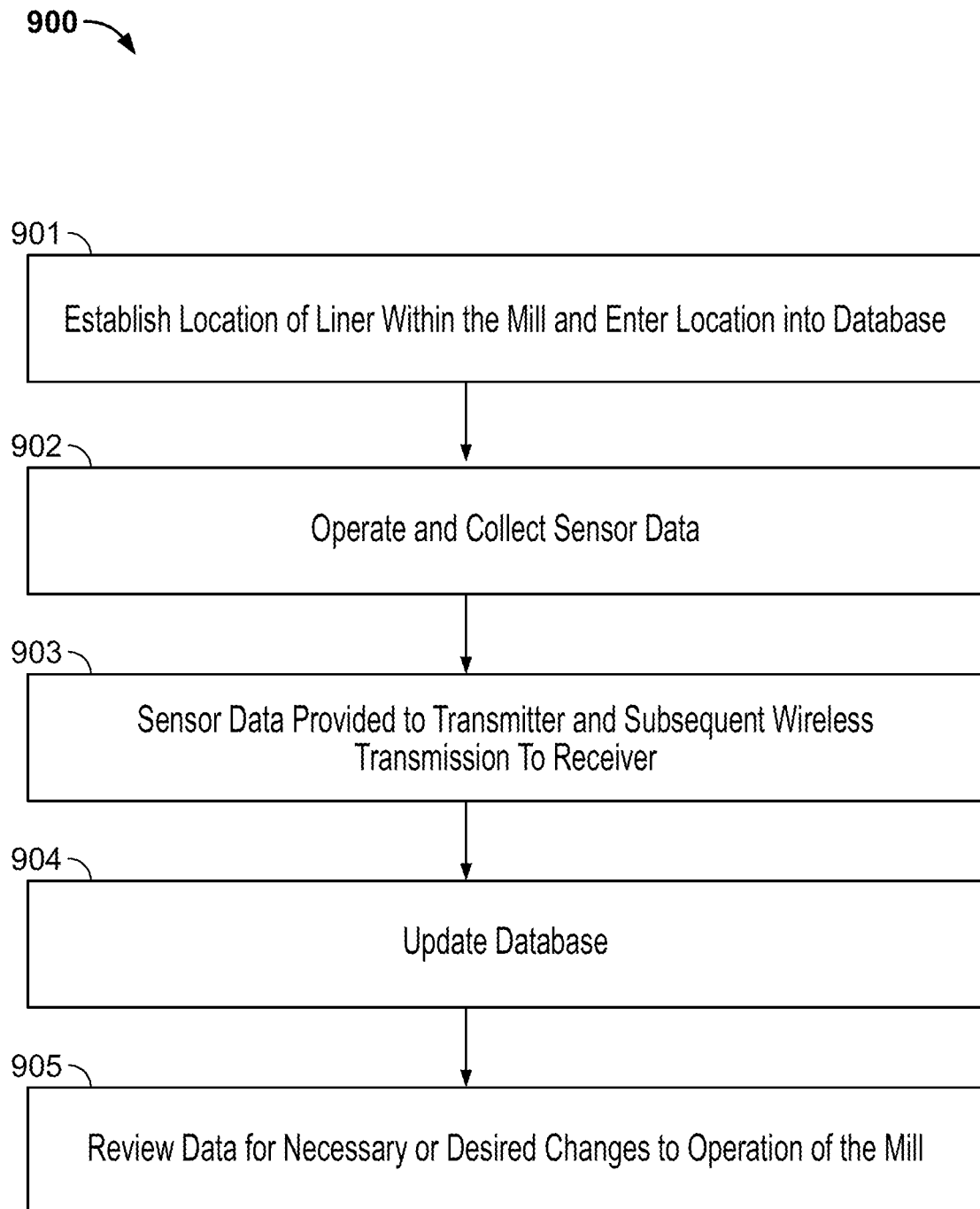
FIG. 9 is an illustration of the method steps which may be used to practice the principles of the present invention.

Next referring to FIG. 9, a flow chart illustrating the logical steps which may be taken in operation is disclosed generally at 900. At block 901, the liner assemblies 10 are installed within the mill. In the event that it is the initial installation of liner assemblies 10 in accordance with the principles of the invention, then each of the liner assemblies 10 will be installed and the specific position registered using an RFID sensor 811 and added to a database, spreadsheet, or other information presentation array (referred to for convenience as "database") in computer 806. Thus, the RFID tag aids in identifying from which liner assembly 10 the data provided by the plurality of sensors 802a-802n is coming. After initial installation, the comminution mill may be periodically stopped for replacement of liner assemblies 10 that have reached the predetermined wear in thickness or other predetermined wear profile. The replacement liner assemblies 10 also preferably include an RFID tag to aid in registering the location of the specific liner within the mill.

At block 902, the mill is operated and the sensors 802a-802n provide data to the respective DTU 30. At block 903, the DTUs 30 receive the data from the sensors 802a-802n. The data may be stored in a temporary fashion for batch transmission or may be transmitted in real-time. If batch transmission is utilized, those of skill in the art will recognize that a relatively shorter period of time between transmissions may be more useful for an operator or user to review the sensed data via the mill performance evaluation block 805. The data is transmitted from the DTUs 30 in a wireless fashion from transmitters 803a-803n to antenna 810. At block 904, the CPU 808 moves the data from receiver 807 and updates the database in memory 809. As data accumulates, the data may be stored in cloud storage 812 or on server 813. In addition, by moving the data to one or both of these areas, remote viewing of the data is enabled.

At block 905, the updated database is provided to the operator via user interface 820. Based on the data from the various sensors, the user may determine that a change in operation is desired or necessary. Further, the data may indicate the one or more liner assemblies 10 should be replaced—e.g., either because a wear profile has been reached and/or a sensor has stopped operating. Representative actions which may be taken by an operator reviewing the data are provided in the following Table 1.

TABLE 1

| SENSOR | USE | IF | THEN |
| --- | --- | --- | --- |
| RFID Sensor | RFID Tags are programmed with information | When liner is installed | Triggers log event Liner is entered into database |
|  |  | Liner is removed | Triggers log event Liner is updated in database Liner lifecycle is established |

TABLE 1-continued

| SENSOR | USE | IF | THEN |
| --- | --- | --- | --- |
| Inertial Sensor (Inclinometer and accelerometer) | Works with acoustic sensor Detects angular location | Large impacts are detected | A) Mill speed decreases B) Ore feed rate increases |
| Acoustic | Detect impact of grinding media | Large impacts are detected | A) Mill speed decreases B) Ore feed rate increases |
| Ultrasonic Transducer | Monitor mill liner wear surface thickness | Liner(s) become worn and/or reach a predetermined wear profile | Liner(s) are changed to protect the mill shell |

As noted in the above Table 1, in the event that certain conditions arise, then an action may be taken to increase the efficiency of the operation of the mill. Further, the efficiency of keeping the mill in operation until required replacement of liner assemblies 10 is also maximized.

An embodiment is fully and clearly described above so as to enable one having skill in the art to understand, make, and use the same. Those skilled in the art will recognize that modifications may be made to the description above without departing from the spirit of the invention, and that some embodiments include only those elements and features described, or a subset thereof. To the extent that modifications do not depart from the spirit of the invention, they are intended to be included within the scope thereof.

It should be understood that even though numerous characteristics and advantages of the present invention have been set forth in the foregoing description, together with details of the structure and function of the invention, the disclosure is illustrative only and changes may be made in detail, especially in matters of the supporting hardware, components and devices, and to the full extent indicated by the broad general meaning of the terms in which the appended claims are expressed.

What is claimed is:

1. A method for determining a timing for replacement of a liner assembly within a comminution mill, the comminution mill having an external shell, comprising:
   a) placing a sensor for directly measuring a wear profile of the liner assembly, the liner assembly including a body and a cavity open to the shell, and locating the sensor within the cavity;
   b) registering a position of the liner assembly within the comminution mill, whereby the position of the liner assembly within the comminution mill is known;
   c) storing the position of the liner assembly using a non-transitory memory associated with the comminution mill; and
   d) monitoring an output of the sensor to determine the timing for replacement of the liner assembly based on the wear profile, and wherein the sensor transmits ultrasonic waves within the body of the liner assembly to determine a depth of the body for comparison to the wear profile.

2. The method of claim 1, wherein registering the position of the liner assembly utilizes an RFID tag with a unique identification information in the liner assembly.

3. The method of claim 1, further comprising transmitting the determined depth of the body to a computer for comparison to a stored predetermined wear profile.

* * * * *